United States Patent Office 3,067,483
Patented Dec. 11, 1962

3,067,483
SHEET MATERIAL AND PROCESS OF
MAKING SAME
Joseph Lee Hollowell, Cornwall-on-Hudson, N.Y., assignor to E. I. du Pont de Nemours and Company, Wilmington, Del., a corporation of Delaware
No Drawing. Filed Aug. 24, 1959, Ser. No. 835,431
14 Claims. (Cl. 28—80)

This invention relates to novel fibrous sheet materials which have a unique combination of properties including flexibility, high mechanical strength, moisture permeability and method of making same. A preferred embodiment of the invention concerns the manufacture of a material having a soft and drapy hand similar to that of soft leather suedes.

This application is a continuation-in-part of my copending application S.N. 790,819, filed February 3, 1959, which is a continuation-in-part of S.N. 746,340, filed July 3, 1958, both applications now abandoned.

The limitations of soft leather suedes constitute a problem which has faced the suede industry for many years. Like most products of natural origin, their properties vary from batch to batch and piece to piece, making it difficult to produce uniform quality. In addition, the size of the pieces obtainable is limited to the size of the animals from which the skins are taken, which necessitates costly piecing and matching to produce large articles. Soft leather suedes are also known to "crock," that is, they tend to shed their color when abraded. Moreover, laundering usually results in a shrunken and wrinkled product. Ease of soiling and difficulties in dry cleaning are further typical drawbacks.

Many unsuccessful attempts have been made to produce a man-made soft suede which overcomes these limitations in the natural product and yet retains the excellent hand and drape qualities. Prior attempts to make such a material have included such methods as treating woven or non-woven fabrics with plasticized resins such as polyvinyl chloride, and applying flocks to fabrics coated with initially tacky rubber compositions. Heretofore, manmade suedes have usually been inferior to the natural material, and never have they been superior to it in most respects. For example, some have been poor in appearance and inferior in wear resistance. Others have turned stiff or brittle after a few months' time. Most have lacked the drape and hand characteristics required in good quality garment material, being either rubbery, boardy, papery, or stiff. In many cases they have had little or no moisture permeability. Virtually none have been capable of withstanding repeated laundering or ordinary dry cleaning.

The primary object of this invention is to provide a flexible moisture permeable fibrous sheet material.

Another object is to provide a soft and drapy suede-like material having a thickness of .005 to .10 inch and a degree of suppleness within the range of 1.0 to 65 pounds per square inch as determined by the cantilever test described below.

A further object is to provide practical methods for making these materials.

Other important objects will be apparent from the following description of the invention.

Briefly stated, the novel sheet materials of this invention are made by forming a ligated mat or web comprising retractable fibers, treating the mat so as to retract the fibers sufficiently to result in at least about 30% and up to about 90% reduction in the surface area of the mat, and impregnating the shrunken mat with about 10% to 70% of a polymeric material, based on the combined dry weight of the fiber and impregnant. The reduction in mat surface area is referred to in the claims as planar shrinkage. The impregnant is a polymer of low elastic modulus, i.e., the binder distributed throughout the mat must be in a form, when free of fiber, comparable to that which has a tensile stress at 5% elongation of at least 5 pounds per square inch, but less than 150 pounds per square inch and preferably less than 100 pounds per square inch. The particularly preferred impregnant has a tensile stress at 5% elongation less than 50 pounds per square inch.

The finished product has a degree of suppleness not achieved by prior art high strength non-woven mats bound with a synthetic polymer. This degree of suppleness is defined as being less than 65 pounds per square inch as determined by the cantilever test in ASTM D1388–55T. The suppleness is expressed as bending stiffness in pounds per square inch obtained by dividing the cantilever value by the cube of the thickness of the material.

The modulus of elasticity is defined as the ratio within the elastic limit of a material, of stress to corresponding strain. Tensile stress is defined as the force per unit of original cross-sectional area required to stretch the specimen to a stated elongation. Tensile stress is expressed as pounds per square inch of the original cross-sectional area at the stated elongation.

Shrinking of the mat is done with hot water or other means capable of retracting the fibers without fusing or damaging them. The impregnant is preferably introduced into the mat in the form of a solution or aqueous dispersion. It is to be understood, however, that the impregnant can be introduced into the mat by other techniques, such as, e.g., distributing it throughout the mat in the form of dry powder or slurry of fibrils. After the impregnant is introduced into the shrunken mat in the form of solution or dispersion, it is coalgulated by immersing the mat in a coagulant or other appropriate means after which the mat is dried. In the case of the solution impregnated mats, the solvents for the binder are washed free of the mat before drying. A nap is raised on one or both faces of the product when a suede material is desired.

As the invention is described in greater detail, it will be seen that some embodiments of the process will include such steps as roller squeezing or wringing the wet mat after it is impregnated and again after it is bathed; hot pressing the mat before or after it is impregnated; dyeing the mat, buffing and brushing it at any convenient point in the process; or treating the product with various known fabric finishing materials such as softeners, water repellents, and flexible polymeric surface coatings.

By the term "ligating" is meant the binding together of adjacently disposed fibers lying substantially parallel to the plane of the mat (or faces of the mat) by forcibly orienting sufficient fibers to a position substantially perpendicular to the plane of the mat that a unitary, dense coherent structure is formed. In the present invention, the preferred fiber orientation is accomplished by punching the mat with fine, barbed needles, which are mounted in a conventional needle loom.

The following preferred embodiments, in which an improved suede is produced, is intended only to illustrate the invention and not to limit it in any way. Throughout the specification and claims, all parts and percents are by weight unless otherwise specified.

Example I

A quantity of 0.5 denier polyethylene terephthalate filaments having the capacity to retract about 70% of their drawn length when boiled in water is prepared in the manner taught by H. J. Kolb in U.S. Patent 2,758,908. The uncrimped filament is treated with 0.2% of "Ceranine" HC, a cationic softener made by Sandoz Chemical Works, and cut into 1.5 inch staple fibers. Nine parts of fibers described above and one part of 1.5 denier 1.5 inch crimped staple fibers of polyethylene terephthalate are opened and blended on a roller card. The blended fibers are carded and cross-lapped in a conventional manner into a loose layered mat having a thickness of about 1.5 inches, a weight of 5.5 ounces per sq. yd., and a specific gravity of 0.004. Now ready for needle-punching, the loose mat is placed on a carrier to feed into a needle-loom.

The needles are mounted on the needle boards at a density of four per square inch. The loom operates at 240 perforation cycles per minute. The beam is set at $2^{15}/_{16}$ inches, and the stroke is $2\frac{1}{2}$ inches. While the needles are drawn clear of the mat, the mat advances at the rate of 0.285 inch per cycle.

After the first pass through the loom, the mat is removed from the carrier. Next, the mat is turned over and needled on the other side while supported on a carrier. This procedure of needling alternate sides is repeated until the mat has received a total of 16 passes through the loom at the above rate, 8 on each side. As the needles enter the mat, they force numerous closely spaced fibers, individually or in small groups, into and through the mat to assume positions substantially perpendicular to the mat faces. Thus the layers of fibers are bound together and compacted by the needling operation. Needling density or total punches per square inch, is 3100. The mat now has a thickness of 0.035 inch and a specific gravity of 0.13.

The mat, in a relaxed condition, is immersed in water at about 174° F., where it remains for a period of about 3 minutes. During this heating period the mat gradually shrinks, losing about 53% of its area. The shrinkage results from linear retraction and crimping of the highly retractable polyethylene terephthalate fibers. At this point these fibers have a residual shrinkage potential sufficient to cause a further area shrinkage of about 10 to 20% if the mat were dipped in boiling water.

The shrunken mat, while still relaxed, is removed from the hot water, cooled, and drained until relatively free of water. The wet shrunken mat is passed over drying cans heated to about 250° F. until substantially dry.

Densified and dried, the shrunken mat is 50 mils thick, with a specific gravity of 0.17. Smooth and uniform in appearance, it is also resistant to delamination and tearing. The needle-entry points are not discernible at this stage.

A polyurethane elastomer impregnating solution is prepared as follows: 73.5 parts of polytetramethylene ether glycol of 1000 molecular weight are dimerized with 6.4 parts of tolylene-2,4-diisocyanate by mixing together and heating for 3 hours at 194° F. The resulting dimer is capped with methylene bis (4-phenyl isocyanate) by mixing 6.4 parts of the former with 18.4 parts of the latter and heating for 1 hour at 176° F. The capped dimer, a prepolymer with isocyanate end groups, is dissolved in sufficient N,N-dimethyl formamide to form a 20% solution. Separately, a 20% solution of hydrazine hydrate is prepared with the same solvent. Dibutyl amine is added to the hydrazine hydrate solution in the amount of 0.15% of the hydrazine hydrate present; this serves as a chain-stopper. The two solutions are then mixed together to form a 20% elastomer solution. For the impregnating operation to follow, the solution is diluted with N,N-dimethyl formamide (referred to hereinafter as "DMF") to an elastomer of about 7.5% which results in a viscosity of about one poise at 75° F.

The previously described densified and dried mat (specific gravity of 0.17) is immersed in the 7.5% solution of the elastomer at 75° F., thereby becoming substantially saturated with the solution. As the mat leaves the impregnating solution, it passes between a pair of squeeze rolls, of which the bottom roll is driven and the top roll is free running and weighted to exert about 2 pounds of pressure per inch of mat width. Excess impregnating solution is removed from the mat's surface by the squeeze rolls, and sufficient elastomer remains within the mat after squeezing to yield an elastomer/fiber ratio of 35 parts of elastomer for each 100 parts of fiber. The residual shrinkability left in the fibers after the previously described shrinking step is neutralized by the solvent in the elastomer solution without causing further shrinkage of the mat.

The elastomer is coagulated uniformly throughout the dense fibrous structure of the mat by immersing the roller-squeezed mat in water at about 75° F., where it remains until the binder is coagulated throughout the mat. The material is passed through wringer rolls which exert sufficient pressure on the mat to remove about as much water and solvent as possible without crushing or otherwise damaging the mat. After passing between the wringer rolls, the mat is washed with water until substantially free of solvent for the binder.

Next, the impregnated mat is dried by passing it around a series of six drums heated at 275° F. The smooth, heated drums effect a smoothing or ironing action on the mat as it dries. The dry sheet has a specific gravity of 0.24.

Employing a machine commonly used for raising a nap on fabrics and leather, both surfaces of the sheet are buffed with a #240 emery cloth covered roll until a fine uniform downy nap is produced. A brief brushing follows buffing to remove dust and enhance the nap. Then the suede-like sheet is dyed. This process consists of first scouring the sheet for ½ hour in water at 212° F. containing 1% of "Duponol" RA, a wetting agent, and 1% of 28% strength ammonium hydroxide. The sheet is scoured in 20 times its own weight of the above solution. Next, it is rinsed in water and immersed in a 5% aqueous dye solution for 120 minutes at a temperature of about 212° F. The dyeing process is completed by scouring the colored sheet for 30 minutes in a water bath at 212° F. containing "Duponol" RA active agent in the amount of 0.5% by weight of the sheet, rinsing and drying. The dyed sheet has the following properties:

| | |
|---|---|
| Ratio of impregnant/fiber | .35/1.00. |
| Weight | 6.5 oz./sq. yd. |
| Thickness | .039 inch. |
| Density | 0.23 gm./cc. |
| Bending stiffness (cantilever ASTM D1388–55T) | 7.3 pounds per square inch. |
| Tensile strength | 5.5 lbs./in./oz./sq. yd. |
| Tongue tear | |
| Air porosity (permeability) | 0.8 lbs./oz./sq. yd. |
| Elastic modulus (extrapolated from 5% elongation) | 80 cc. per sec./sq. in./5 gm. wt. 400–900 p.s.i. |
| Elongation at break | 97.105%. |

A 10 mil thick film of the binder was prepared by coating the impregnating solution on a glass plate and then, before any appreciable amount of solvent was evaporated, the glass plate with the film thereon was immersed in water at about 24° C. for about 30 minutes to coagulate the polymer and extract the solvent. The film, stripped from the plate, was then dried in an oven at about 120° C. The film, which was in substantially the same form as the binder in the mat of the above described example, had a tensile stress at 5% elongation of 21 pounds per square inch.

The product of this example has a soft and drapy hand resembling that of the better grades of soft leather suedes. Smooth and uniform in appearance, the product is especially useful for making such garments as jackets, skirts and slacks. Garments made from this new suede material are durable, attractive and comfortable. Quite unexpectedly, they can be laundered repeatedly in conventional washing machines without damage. They can also be dry cleaned with the usual dry cleaning fluids, such as, e.g., perchlorethylene. The material remains supple and moisture permeable during extended use. It was surprising that such a desirable combination of properties could be attained in a polymer-treated non-woven fabric.

A further modification involves surface coating the above described sheet material with a solution of the same elastomer used to impregnate the shrunken mat to produce an upholstery material. Pigmented and plasticized polyvinyl chloride compositions are also applied as surface coatings to the above described sheet material to produce a high grade upholstery material.

A product was made as described in Example I except the coagulating step was omitted and the solvent for the impregnant was removed by heating. The product had a bending stiffness of about 103 p.s.i. as measured by the cantilever test in ASTM D1388-55T, and did not have a soft drapy hand.

*Example II*

A needle ligated mat as described in Example I was impregnated uniformly throughout with an aqueous dispersion containing 11.5% non-volatile components of the following formula:

| | Parts by weight |
|---|---|
| Butyl rubber | 100 |
| Zinc oxide | 10 |
| Zinc diethyl dithiocarbamate | 1 |
| Heat stabilizer | 1 |

After the mat was thoroughly impregnated with the above described aqueous dispersion, it was passed between squeeze rolls to remove excess impregnant. The impregnant was coagulated throughout the mat by immersing the impregnated mat in a saturated solution of zinc chloride in ethyl alcohol. The mat was washed free of coagulant with water and then dried. The dried impregnant was cured by subjecting the treated mat at 150° C. for 25 minutes.

As a final operation, the mat with cured impregnant distributed throughout was buffed on each side with abrasive covered rolls to raise the nap and render the product more suede-like. The product had the following properties:

| | |
|---|---|
| Weight | 4.1 oz./sq. yd. |
| Ratio impregnant/fiber | .30/1.0. |
| Thickness | .030 inch. |
| Bending stiffness (cantilever test ASTM D1388-55T) | 7.1 p.s.i. |
| Tensile strength | 2.5-3.5 lb./in./oz. sq. yd. |
| Elongation at break | 137-143%. |
| Tongue tear strength | 0.9-1.2 lb./oz./sq. yd. |
| Density | 0.18 g./cc. |

A 10 ml thick film was prepared by casting the impregnating composition of this example on a glass plate, drying the film and curing it in the same manner as the impregnated mat. After the curing operation and stripping from the glass plate, the 10 mil thick film had a tensile stress at 5% elongation of 7 pounds per square inch.

*Example III*

A product similar to that described above in Example II was obtained by following the same procedure but using an 11.5% solids aqueous dispersion containing the following dry ingredients:

| | Parts by weight |
|---|---|
| Chemigum (copolymer of about 70 parts butadiene and about 30 parts acrylonitrile) | 100 |
| Zinc oxide | 10 |
| Sulfur | 2 |
| Zinc diethyl dithiocarbamate | 1 |
| Heat stabilizer | 1 | and coagulating the impregnant throughout the mat by immersing it in a 5% aqueous solution of calcium chloride.

The product had the following properties:

| | |
|---|---|
| Weight | 6.6 oz./sq.yd. |
| Ratio impregnant/fiber | 0.35/1.0. |
| Thickness | .042 inch. |
| Bending stiffness (cantilever test ASTM D1388-55T) | 7.4 p.s.i. |
| Tensile strength | 2.1-3.9 lbs./in./oz./sq.yd. |
| Elongation at break | 122-153%. |
| Tongue tear | 0.8-1.1 lbs./g./sq.yd. |
| Density | 0.21 g./cc. |

A 10 mil thick film of the binder was prepared from the impregnating composition of this example by casting the composition on a glass plate and curing it in the same manner as the impregnated mat. This film had a tensile stress at 5% elongation of 33 pounds per square inch.

Other proprietary copolymers of butadiene and arcylonitrile referred to as "Hycar" 1551, "Hycar" 1552, "Hycar" 1562 and "Hycar" 1571 have also been found useful in place of "Chemigum" 200 in the above-described Example III to produce the products of this invention.

*Example IV*

Example III was repeated using Neoprene 601A polychloroprene elastomer in place of the "Chemigum" 200 in the impregnating composition. The product had the following properties:

| | |
|---|---|
| Weight | 5.8 oz./sq.yd. |
| Ratio impregnant/fiber | 0.36/1.0. |
| Thickness | .035 inch |
| Bending stiffness (cantilever test ASTM D1388-55T) | 12.1 p.s.i. |
| Tensile | 2.9-5.6 lb./in./oz./sq.yd. |
| Elongation at break | 117-158%. |
| Density | 0.22 g./cc. |

A 10 mil thick film was prepared from the impregnating composition of this example by casting it on a glass plate and curing in the same manner as the impregnated mat. The cured film had a tensile stress at 5% elongation of 14 pounds per square inch.

*Example V*

Example III was repeated using "Pliolite" 2000 (copolymer of about 50% butadiene and about 50% styrene) in place of the "Chemigum" 200 in the impregnating composition.

The product had the following properties:

| | |
|---|---|
| Weight | 5.4 oz./sq.yd. |
| Ratio impregnant/fiber | 0.39/1.0. |
| Thickness | .036 inch. |
| Bending stiffness (cantilever test D1388-55T) | 13.7 p.s.i. |
| Tensile strength | 5.1-5.9 lb./in./oz./sq.yd. |
| Elongation at break | 155-158%. |
| Density | 0.20 g./cc. |

A 10 mil thick film was prepared from the impregnating composition of this example by casting the composition on a glass plate and then curing it in the same manner as the impregnating composition. The cured film had a tensile stress at 5% elongation of 30 pounds per square inch.

*Example VI*

A product similar to that described above in Example

II was obtained by using the same mat as described in Example II and impregnating it with an 11.0% solids aqueous dispersion of the following dry ingredients:

| | Parts by weight |
|---|---|
| HA159 polyalkyl acrylate | 100.0 |
| OR–401 urea/formaldehyde resin | 5.0 |
| Catalyst | 0.5 |

The coagulating step of Example II was omitted.

The drying of the impregnated mat was carried out at 155° C. in place of the drying temperature of Example I. The product had the following properties:

| | |
|---|---|
| Weight | 5.5 oz./sq.yd. |
| Ratio impregnant/fiber | 0.29/1.0. |
| Thickness | .033 inch. |
| Bending stiffness (cantilever test ASTM D1388–55T) | 15.2 p.s.i. |
| Tensile strength | 3.2–5.3 lbs./in./oz./sq.yd. |
| Elongation at break | 145–152%. |
| Density | 0.21 g./cc. |

A 10 mil thick film was prepared from the impregnating composition of this example by casting the composition on a glass plate and then curing it in the same manner as the impregnated mat. The cured film had a tensile stress at 5% elongation of 47 p.s.i.

*Example VII*

Example III was repeated using an aqueous dispersion of terpolymer derived from 35 parts of acrylonitrile, 60 parts di(2 ethyl hexyl) acrylate and 5 parts methacrylic acid as the impregnating composition.

The product had the following properties:

| | |
|---|---|
| Weight | 5.8 oz./sq./yd. |
| Ratio impregnant/fiber | 0.28/1. |
| Thickness | .039 inch. |
| Bending stiffness (cantilever test ASTM D1388–55T) | 28.3 p.s.i. |
| Tensile strength | 4.5–6.9 lb./in./oz./sq.yd. |
| Elongation at break | 102–106%. |
| Density | 0.20 g./cc. |

A 10 mil thick film was prepared from the impregnating composition of this example by casting the composition on a glass plate and drying it in the same manner as the impregnated mat. The dried film had a tensile stress at 5% elongation of 113 pounds per square inch.

*Example VIII*

An air permeable suede shoe upper material is made by repeating Example I and using .8 denier polyethylene terephthalate filaments in place of the .5 denier. The impregnating solution is a 9.0% solution of a blend of 85% of the polyurethane elastomer of Example I and 15% polyvinyl chloride dissolved in DMF in place of the 7.5% solution of the polyurethane elastomer in DMF. The planar shrinkage of the mat prior to impregnation is 5% instead of 53%. The weight of the mat is 6.1 ounces per square yard and the dry impregnant is 3.4 ounces per square yard for a total weight of 9.5 ounces per square yard instead of 6.5 ounces per square yard. The product has the following properties:

| | |
|---|---|
| Ratio impregnant/fiber | .56/1. |
| Weight | 9.5 oz./sq. yd. |
| Thickness | 0.040 inch. |
| Density | .32 g./cc. |
| Bending stiffness (cantilever test ASTM D1388–55T) | 44.0 p.s.i. |
| Tensile strength | 3.5 lbs./in./oz./sq. yd. |
| Tongue tear | .31 lbs./oz./sq. yd. |
| Elongation at break | 110.0%. |

*Example IX*

An air permeable suede shoe upper is made by repeating Example I using .8 denier filaments of polyethylene terephthalate in place of the .5 denier. The impregnating solution is a 10% solution of the polyurethane elastomer of Example I in DMF in place of the 7.5 solution. The planar shrinkage of the mat prior to impregnation is 60% instead of 53%. The weight of the mat is 7.3 ounces per square yard and the dry weight of the impregnant is 2.4 ounces per square yard for a total weight of 9.7 ounces per square yard instead of 6.5 ounces per square yard. The product has the following properties:

| | |
|---|---|
| Ratio impregnant/fiber | .33/1. |
| Weight | 9.7 oz./sq. yd. |
| Thickness | .050 inch. |
| Density | .27 g./cc. |
| Bending stiffness (cantilever test ASTM D1388–55T) | 15 p.s.i. |
| Tensile strength | 3.0 lbs./in./oz./sq. yd. |
| Tongue tear | .40 lbs./oz./sq. yd. |
| Elongation at break | 125%. |

The fibrous mat can be composed of both non-retractable fibers and retractable fibers. In the case of mats made from such blends of fibers, sufficient retractable fibers must be used to bring about a planar shrinkage of the mat from 30–90%. The amount of shrinkable fibers required to bring about this amount of planar shrinkage will vary from fiber to fiber depending upon the shrinkability of the fiber and the force exerted during its retraction. The retraction may result from a simple reduction in length, or from distorting or crimping of the fibers into an irregular shape.

Especially desirable results in making suede materials are obtained with polyethylene terephthalate fibers prepared in accordance with the teaching of U.S. Patents 2,604,689 or 2,758,908. These polyester fibers have the property of retracting when heated in hot water or in hot air below the bonding temperature of the fiber. When crimped, the fibers have wool-like appearance and resilience, and are desirably interlocked in the mat. Another type of retractable filamentary material that can be used in the above example as a direct replacement for the polyethylene terephthalate fibers is regenerated cellulose of the kind described by Nicoll in U. S. Patent 2,515,834. These fibers crimp spontaneously at room temperature in a swelling agent, such as, e.g., an aqueous alkali. Liquid ammonia will also cause retraction, by shrinkage rather than crimp formation, of ordinary viscose rayon, which also can be used in preparing the products of this invention.

Other synthetic polymeric fibers can be manufactured so as to have the necessary retraction characteristics, including polytetrafluoroethylene, cellulose acetate, nylon, 40–60 copolymer of acrylonitrile and vinyl chloride, 10/90 copolymer of vinyl chloride and vinylidene chloride, polyethylene and polystyrene. While these other fibrous materials are not preferred over polyethylene terephthalate, they can be used alone or blended with each other. The preferred polyethylene terephthalate fiber can be blended with any of the aforementioned fibers.

The following table illustrates the retraction medium, time, temperature and amount of retraction for needled unimpregnated mats for various fibers listed above for a given denier:

ing usually have a specific gravity in the range of 0.08 to 0.19, and preferably about 0.13 to 0.15.

TABLE I

| Fiber and Denier | Retraction Medium—Temperature | Specific Gravity | | Time (Minutes) of Exposure in Retraction Medium | Percent Planar Area Loss of Mat |
| --- | --- | --- | --- | --- | --- |
| | | Before Retraction | After Retraction | | |
| Cellulose acetate, 2 denier staple | 49% Aqueous acetone—20° C | 0.09 | 0.14 | 0.5 | 69 |
| Nylon, 6 denier staple | Dilute nitric acid—20° C | 0.09 | 0.10 | 1.0 | 55 |
| 40/60 Acrylonitrile/vinyl chloride copolymer, 5 denier staple | Air—150° C | 0.11 | 0.12 | 5.0 | 41 |
| 10/90 Vinyl chloride/vinylidene chloride copolymer, 25 denier staple | Air—170° C | 0.19 | 0.28 | 5.0 | 77 |
| Polyethylene, 6 denier staple | Water—100° C | 0.17 | 0.26 | 0.5 | 80 |
| Polystyrene, 4 denier | Air—110° C | 0.10 | 0.18 | 5.0 | 60 |
| Polytetrafluoroethylene 3-5 denier staple | Air—300° C | | | 60.0 | 40 |
| Polytetrafluoroethylene 3-5 denier staple | Air—325° C | | | 270.0 | 75 |

In the case of those fibers which tend to be dissolved in the solvent for the elastomer, it is desirable to reduce the solvent action of the solvent by incorporating a non-solvent, such as e.g., water, glycols or alcohols up to the point of incipient gelation of the elastomer and then after impregnation of the mat immediately coagulating the binder throughout the mat in order to remove the solvent from further contact with the fibers.

The non-retractable fibers may be natural or synthetic, straight or crimped fibers. The amount of non-retractable blending fibers to use in any particular case will be governed largely by the intended use of the product, and the retraction capacity and efficiency of the shrinkable fiber.

The denier of the retractable fibers is preferably no higher than 1.5, and those having a denier of about 0.5 to 1.0 are particularly preferred. Somewhat coarser fibers are sometimes desirable in the suede type products to modify the nap characteristics. Fiber length in any case can vary from about 0.5 inch to about 3 or 4 inches, although 1.0 to 1.8 inch fibers are preferred. Shorter fibers tend to reduce the products' tensile and tear strengths and longer fibers are more difficult to handle in mat formation.

The fibers are formed into a loose mat of convenient thickness in any known manner. In most cases the initially formed mat will weigh from about 4 to about 10 ounces per square yard. Although the carding method is preferred, the mat may also be formed on a foraminous carrier from a liquid suspension of fibers, or blown or dropped from an air suspension. The technique of mat formation described by F. Wilcox in copending application S.N. 726,186, filed April 3, 1958, now U.S. Patent 3,007,840, is particularly useful in practicing this invention. Cross-lapping the fibers into layers of dissimilar orientation within the plane of the mat provides equalized contraction of the mat in the subsequent shrinking step, and a product having balanced stretchability. When unidirectional stretchability is preferred, of course the cross-lapping is omitted; that is, most of the fibers are laid whereby they have similar orientation in the plane of the mat.

During the important needling step the loose mat is converted into a uniformly dense and smooth felt-like structure by the barbed needles. The needles force numerous fibers, singly or in groups, into positions relatively perpendicular to the faces or plane of the mat, rendering the mat compact and coherent. Each square inch of the mat should preferably receive at least about 1500, and not more than about 3800 needle punches, referred to as perforation density. This is best accomplished stepwise on alternate sides of the mat in about 8 to 20 passes through a conventional needle-loom. Too low a perforation density yields a loose mat of coarse texture, while excessive needling tends to roughen, stiffen and weaken the mat. The needled mats before shrinking The needled mat should lose about 30 to 90% of its planar area during the shrinking treatment. The resultant densification of the mat supplements the compaction caused by needling to produce a tightly tangled mass of fibers in which the needle marks are substantially obscured. Density of the shrunken mat is usually about 0.10 to 0.28 gram/cc. Excessive shrinkage results in a high density web which results in a slow rate of impregnation and detracts from the product's suppleness. Insufficient shrinkage on the other hand makes for a low density product that is sleazy, weak and dimensionally unstable. The mat is considerably more soft and supple after being properly shrunken.

If the needled mat is heated suddenly it tends to pucker or wrinkle. This is probably the result of the outer layer of fibers shrinking before the inner layer. To insure a smooth wrinkle-free product, therefore, the mat is shrunken gradually. This is conveniently accomplished in the case of retractable polyethylene terephthalate fibers by dipping the mat in water heated to about 170 to 175° F.

The shrunken mat of tightly interlocked retracted fibers is coherent, strong and dense, yet it is soft, smooth and flexible. It has a fine uniform porous texture. Drying of the mat prior to impregnation with binder tends to enhance smoothness. It is important that the mat be shrunk before impregnation, since the solvents for the impregnating elastomer inhibit retraction of the fibers.

Examples of impregnants which have a tensile stress at 5% elongation which are outside of the 5–150 p.s.i. range and when used as the impregnant for the non-woven mats result in a bending stiffness greater than 65 p.s.i. are shown in the following table:

| Binder | Tensile Stress at 5% Elongation, p.s.i. | Bending Stiffness of Product Similar to Example II Using Indicated Impregnant (lbs. per sq. in.) as per Cantilever Test in ASTM D1388-55T), p.s.i. |
| --- | --- | --- |
| Pliolite 170 (copolymer of about 30 parts butadiene and about 70 parts styrene) | 520 | 97 |
| Flexbond (copolymer of about 90 parts vinyl acetate and about 10 parts vinyl stearate) | 290 | 81 |

The particularly preferred range for tensile stress at 5% elongation of the binder as present in the mat is 10–50 p.s.i. The particularly preferred binder is an elastomer formed by employing a compound having 2 active hydrogen atoms bonded to amino-nitrogen atoms to chain extend the reaction product of a polyalkylene ether glycol and an organic diisocyanate. Such an elastomer has the advantages of having high tensile strength without requiring a curing agent and not requiring a plasticizer to achieve the necessary softness, flexibility and elasticity. Furthermore, it is not deleteriously affected by most solvents, soaps, detergents and various materials used in laundering clothes. When solutions of the elastomer are deposited uniformly throughout a fibrous mat in accordance with the method of this invention, the product has a spongy microporous structure.

The especially preferred elastomers useful as impregnants in carrying out this invention can be prepared by first preparing a prepolymer (capped dimer) by mixing a polyalkylene ether glycol with an organic diisocyanate and heating at about 50 to 120°C. whereby a prepolymer is formed having terminal —NCO groups. Alternatively, the diiocyanate can be reacted with a molar excess of the glycol, and the product capped by reacting it with more diisocyanate. The preparation of such elastomers are described in greater detail in a copending application S.N. 556,071, filed December 29, 1955 by Frankenburg & Frazer (now U.S. Patent 2,957,852). The preferred polyurethanes have a molecular weight of 900 to 3000 and are formed from polytetramethyleneether glycol or polypropyleneether glycol, tolylene-2,4-diisocyanate and hydrazine.

The especially preferred elastomeric impregnant is dissolved in sufficient solvent to result in a relatively low viscosity, preferably less than about 3 poises for rapid impregnation. Any good solvent for the elastomer which is completely water-miscible or nearly so, can be used, so long as it does not seriously attack any of the fibers of the mat. While N,N-dimethyl formamide is preferred, other useful solvents include, for example, dimethyl sulfoxide, tetrahydrofuran, tetramethyl urea, N,N-dimethyl acetamide and mixtures thereof. Acetone is useful as a diluent following polymerization. The mat is dipped into the elastomer solution, or the solution is applied to the mat until the mat is substantially saturated with the solution. The mat is then drained or squeezed free of excess solution so that no free solution remains on the surface and so that the mat contains from about 10 to about 70% by weight of elastomer solids based on the combined weight of impregnant and fiber in the mat. Excessive elastomer makes the product rubbery. Too little, on the other hand, results in a sleazy product with poor strength, elasticity and dimensional stability. Mat density, concentration and viscosity of the impregnating solution, and the extent of squeezing or draining after impregnation are all factors which control the elastomer content of the mat. The impregnated mat is bathed or treated with water in any convenient manner to coagulate the impregnant uniformly throughout the mat, for example, by immersion or spraying. In most cases the coagulation is substantially complete within about 30 seconds of treatment, but continued treatment with water is necessary to flush all or most of the solvent from the mat. If more than about 5% of solvent, based on the elastomer content within the mat, remains after the water treatment, the product cannot be subjected to elevated drying temperatures without destroying the suppleness of the product. After the impregnated mat is water-bathed sufficiently to remove all or nearly all of the solvent, it is force dried with the aid of heat, preferably by means which further improve its smoothness. The drying can be performed in an oven, by passing the mat over smooth heated rotating drums, or by other known web-drying methods. For some purposes, the product is now complete except for buffing. When a colored product is desired, a dyeing step is included at any convenient stage in the process.

When a denser product is wanted, the dried sheet is pressed between 2 smooth heated surfaces. The time, temperature and pressure of pressing are controlled to maintain product permeability and suppleness, as will be apparent to those skilled in the art.

A nap is raised on one or both sides of the smooth, supple microporous sheet in any suitable manner known in the art of napping fabrics and tanned skins. A preferred napping process involves buffing with emery covered rolls followed by brushing. Buffing actually improves the suppleness of the product besides softening its surface feel.

It was surprising and unexpected that a soft downy nap of uniform appearance could be raised on a low modulus elastomer impregnated non-woven mat.

Another optional step in the process of this invention, is to treat the product with known fabric softeners, or to likewise treat the mat at any stage of the process.

It is to be understood that the above-specified steps of needling, shrinking and elastomer impregnating of the retractable mat are the indispensable steps in the process of this invention. Such steps as buffing, brushing, dyeing and pressing, while preferred in many cases, are intended to be optional, and may be included in the process at any convenient point, either prior to or after the impregnating operation.

Printing, stenciling, embossing, preferential dyeing, and other known techniques for surface decoration can be used to modify the product.

The product of this invention, because of its many desirable properties, is eminently suited also for use as a substrate to be coated with any of a multitude of known coating compositions. For example, useful supple sheet materials will result from applying a flexible layer of permeable or impermeable coatings to one or both sides of the napped or plain product. Surface coatings based on vinyl chloride polymers or copolymers are particularly useful. Moisture permeable coatings based on vinyl chloride polymers or polyurethane elastomers are of particular interest, such as e.g., those disclosed in U.S. Patent 2,825,711 or copending application S.N. 723,669, filed March 25, 1958 by E. K. Holden now abandoned, or various synthetic rubbers, such as, e.g., neoprene, copolymer of butadiene and styrene or copolymer of butadiene and acrylonitrile. Soft and moisture permeable leather-like materials can be produced in this manner.

From the foregoing detailed description, it will be apparent that the process and product of this invention have important advantages which represent an advance in the art of making sheet materials which are soft, supple and permeable. The process is practical, economical and readily adaptable to mass production. The invention provides a durable permeable sheet material of extraordinary softness and suppleness. There is also provided a napped garment material of remarkably pleasant hand. The elastic microporous suede-like sheet has unsurpassed appearance and comfort features. Obtainable in an unlimited array of colors, and relatively uniform in properties from batch to batch, the product can be made in most any width and in any length. Long lengths are conveniently shipped and stored in roll form. Garments made from the product not only withstand repeated laundering, but are even softer to touch after such exposure. They also withstand ordinary dry cleaning. The material has good resistance to soiling and to wrinkling.

The principal use for the products of this invention, as previously indicated, is in the apparel industry as a material for making all sorts of garments. Other uses for the products are as filter media, insulation, table and roll coverings, sound and vibration absorbents, liners and paddings for blankets, carpets, sleeping bags, garments and the like, and as special-purpose upholstery materials. Another important use is for the uppers of both men's and women's suede shoes. In addition, they are useful as replacements for polishing felts and chamois.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The embodiments of the invention in which an exclusive property or privilege is claimed are defined as follows:

1. A flexible moisture-permeable sheet material which comprises a ligated fibrous mat comprising in situ-retracted synthetic organic fibers, said mat having been shrunk about 30% to 90% of its original planar area and dispersed throughout said mat 10–70% of a polymeric impregnant based on the combined weight of fibers and said impregnant, said impregnant being in a microporous form which has a tensile stress at 5% elongation of 5 to 150 pounds per square inch, said sheet material having a bending stiffness of 1.0 to 65.0 p.s.i. as determined by the cantilever test in ASTM D1388–55T.

2. A supple sheet material comprising a fibrous mat containing in situ-retracted synthetic organic fibers, numerous closely spaced fibers of said mat having positions substantially perpendicular to the plane of the mat, said mat having been shrunk about 30% to 90% of its original planar area, distributed throughout said mat about 10 to 70% of a polymeric impregnant based on the combined weight of fibers and said impregnant, said impregnant being in a microporous form which has a tensile stress at 5% elongation of 5 to 150 pounds per square inch, said sheet material having a bending stiffness of 1.0 to 65 p.s.i. as determined by the cantilever test in ASTM D1388–55T.

3. A supple sheet material which comprises a nonwoven mat of synthetic organic fibers having been shrunk 30–90% of its original planar area, a portion of said fibers being oriented substantially perpendicular to the plane of the mat, the mat containing about 10–70% of a polymeric impregnant, based on the combined weight of fiber and impregnant, said impregnant being a chain extended reaction product of a polyalkyleneether glycol, an organic diisocyanate and a compound having two active hydrogen atoms bonded to amino-nitrogen atoms, said impregnant being in a microporous form which has a tensile stress at 5% elongation of 5 to 100 pounds per square inch, said sheet material having a bending stiffness of 1.0 to 65 pounds per square inch as determined by the cantilever test in ASTM D1388–55T.

4. The product of claim 1 in which at least one surface has a soft down nap.

5. The product of claim 1 in which said fibers are polyethylene terephthalate fibers.

6. The product of claim 1 in which said fibers have a denier of less than 1.5 and a length of about 0.5 to 4.0 inches.

7. The product of claim 1 in which said fibers have a denier of about 0.4 to 0.7 and a length of 1 to 2 inches.

8. The product of claim 3 in which said polyalkyleneether glycol is polytetramethyleneether glycol.

9. The product of claim 3 in which said polyalkyleneether glycol is polypropyleneether glycol.

10. The product of claim 3 in which said diisocyanate is tolylene-2,4-diisocyanate.

11. The product of claim 3 in which said polymeric impregnant is formed by reacting a polyalkyleneether glycol to 900 to 3000 molecular weight, an organic diisocyanate and hydrazine.

12. The product of claim 1 in which a flexible permeable coating is adhered to one side.

13. The product of claim 12 in which the surface coating consists of vinyl chloride polymers and polyurethanes.

14. A flexible moisture permeable sheet material which comprises a ligated fibrous mat comprising in situ retracted and in situ crimped synthetic organic fibers, said mat having been shrunk about 30% to 90% of its original planar area and dispersed throughout said mat 10–70% of a polymeric impregnant based on the combined weight of fibers and said impregnant, said impregnant being in a microporous form which has a tensile stress at 5% elongation of 5 to 150 pounds per square inch, said sheet material having a bending stiffness of 1.0 to 65.0 pounds per square inch as determined by the cantilever test in ASTM D1388–55T.

References Cited in the file of this patent

UNITED STATES PATENTS

| | | |
|---|---|---|
| 2,181,043 | Boeddinghaus | Nov. 21, 1939 |
| 2,697,048 | Secrist | Dec. 14, 1954 |
| 2,719,795 | Nottebohm | Oct. 4, 1955 |
| 2,723,935 | Rodman | Nov. 15, 1955 |
| 2,774,687 | Nottebohm et al. | Dec. 18, 1956 |
| 2,857,650 | Lauterbach | Oct. 28, 1958 |
| 2,864,093 | Sumner et al. | Dec. 16, 1958 |
| 2,879,197 | Muskat et al. | Mar. 24, 1959 |
| 3,000,757 | Johnston et al. | Sept. 19, 1961 |

UNITED STATES PATENT OFFICE
CERTIFICATE OF CORRECTION

Patent No. 3,067,483            December 11, 1962

Joseph Lee Hollowell

It is hereby certified that error appears in the above numbered patent requiring correction and that the said Letters Patent should read as corrected below.

Column 2, line 33, for "coalgulated" read -- coagulated --; column 3, line 63, after "elastomer" insert -- content --; column 4, lines 45 to 47, should read as shown below instead of as in the patent:

Tensile strength---------------- 5.5 lbs./in./oz./sq.yd.
Tongue tear--------------------- 0.8 lbs./oz./sq.yd:
Air porosity (pereability)----- 80 cc per sec./sq.in./5 gm. wt.

same column 4, line 51, for "97.105%" read -- 97-105% --; column 5, line 54, for "ml" read -- mil --; lines 57 and 58, for "striping" read -- stripping --; column 6, lines 21 and 22, for "arcylonitrile" read -- acrylonitrile --; column 7, line 67, for "5%" read -- 65% --.

Signed and sealed this 28th day of May 1963.

(SEAL)
Attest:
ERNEST W. SWIDER
Attesting Officer

DAVID L. LADD
Commissioner of Patents